United States Patent [19]

Miller et al.

[11] Patent Number: 5,004,266
[45] Date of Patent: Apr. 2, 1991

[54] OCCUPANT RESTRAINT SYSTEM

[75] Inventors: Gregory A. Miller, Troy; Jeffery L. Pearson, Rochester; John D. Horsch, Rochester Hills, all of Mich.

[73] Assignee: General Motors Corporation, Detroit, Mich.

[21] Appl. No.: 527,477

[22] Filed: May 23, 1990

[51] Int. Cl.5 .............................................. B60R 21/20
[52] U.S. Cl. .................................................. 280/743
[58] Field of Search ........................ 280/743, 728, 729

[56] References Cited

U.S. PATENT DOCUMENTS 3,727,942  4/1973  Arntson et al. ..................... 280/743
4,449,728  5/1984  Pilatzki .............................. 280/743
4,887,842 12/1989  Sato .................................... 280/743

Primary Examiner—Kenneth R. Rice
Attorney, Agent, or Firm—Herbert Furman

[57] ABSTRACT

An occupant restraint system for a vehicle occupant includes a folded occupant restraint cushion mounted to a support and a band wrapped around the cushion and having its ends secured to the support. The band includes a weakened portion located above the outer wall of the cushion. The weakened portion is ruptured by the force of the inflating cushion when the internal pressure of the cushion exceeds a predetermined limit to permit the cushion to deploy normal to or toward the occupant. The band delays the initial deployment of the cushion toward the occupant.

4 Claims, 2 Drawing Sheets

OCCUPANT RESTRAINT SYSTEM

This invention relates generally to inflatable occupant restraint systems and more particularly to an occupant restraint system which releasably retains a folded occupant restraint cushion against initial deployment normal to or toward the occupant until the cushion has attained a predetermined internal pressure.

By preventing initial deployment of the cushion normal to or toward the occupant, the engagement of the cushion and the occupant is delayed until a subsequent stage of deployment of the cushion.

BACKGROUND OF THE INVENTION

The restraint system of this invention includes a known restraint module having a support, an enclosure mounted on the support, a folded occupant restraint cushion mounted on the support and housed within the enclosure, and a gas generator or source of pressure fluid which is mounted on the support and communicates with the interior of the folded cushion. The cushion may be folded as shown in co-pending application Ser. No. 270,609, Cok et al., Modular Occupant Restraint System, filed Nov. 14, 1988, now U.S. Pat. No. 4,903,986, and assigned to the assignee of this invention.

In accordance with this invention, a planar band of steel wraps around the folded cushion. The band extends from one edge portion of the support to the other like edge portion thereof over the folded wall portions of the cushion corresponding to such edge portions and the upper wall portion of the cushion. The band includes tapered portions which are asymmetrically arranged with respect to each other and have their apical portions joined across a narrow width juncture or portion which is located approximately midway between the like wall portions of the cushion. During the initial deployment of the cushion, the band prevents the upper wall portion from deploying normal to or toward the occupant and instead forces the cushion to bulge or deploy laterally or generally parallel to the occupant. When the cushion attains a predetermined internal pressure, the cushion ruptures the band at the narrow width portion and then deploys normal to or toward the occupant. The band preferably extends between the longer or 3 and 9 o'clock side edge portions of the support over the fan folded side wall portions of the cushion. The band may also extend between the shorter 6 and 12 o'clock end edge portions of the support over the pleat folded end wall portions of the cushion.

The primary feature of this invention is that it provides an occupant restraint system which releasably retains an inflatable occupant restraint system against deployment normal to or toward the occupant during the initial inflation of the cushion from a source of pressure fluid. Another feature is that the cushion is held against deployment by a planar band which wraps over folded side wall portions and the upper wall portion of the cushion. A further feature is that the band has a weakened portion which ruptures when the internal pressure of the cushion exceeds a predetermined limit to thereby permit deployment of the cushion normal to or toward the occupant. Yet, another feature is that the band is of steel and includes end portions secured to the support to which the cushion is mounted and asymmetrically arranged tapered portions which are joined at their narrow width apical ends to provide the weakened portion.

These and other features of the invention will be readily apparent from the following specification and drawing wherein.

Figure 1:
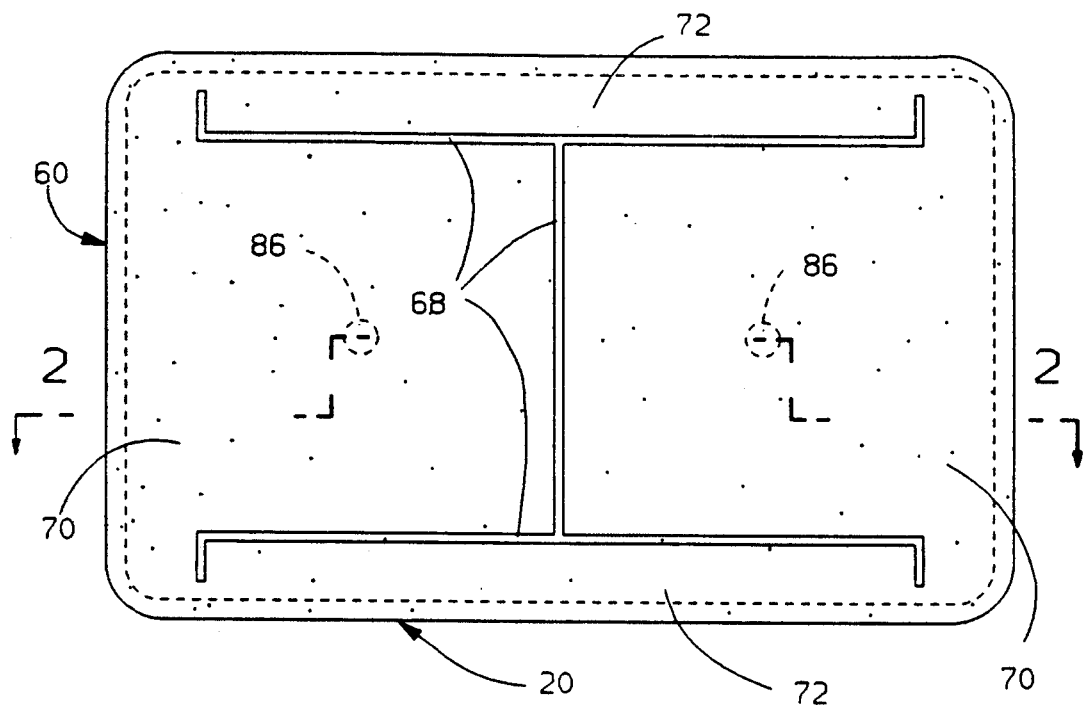
FIG. 1 is a top plan view of an occupant restraint system according to this invention.
Figure 2:
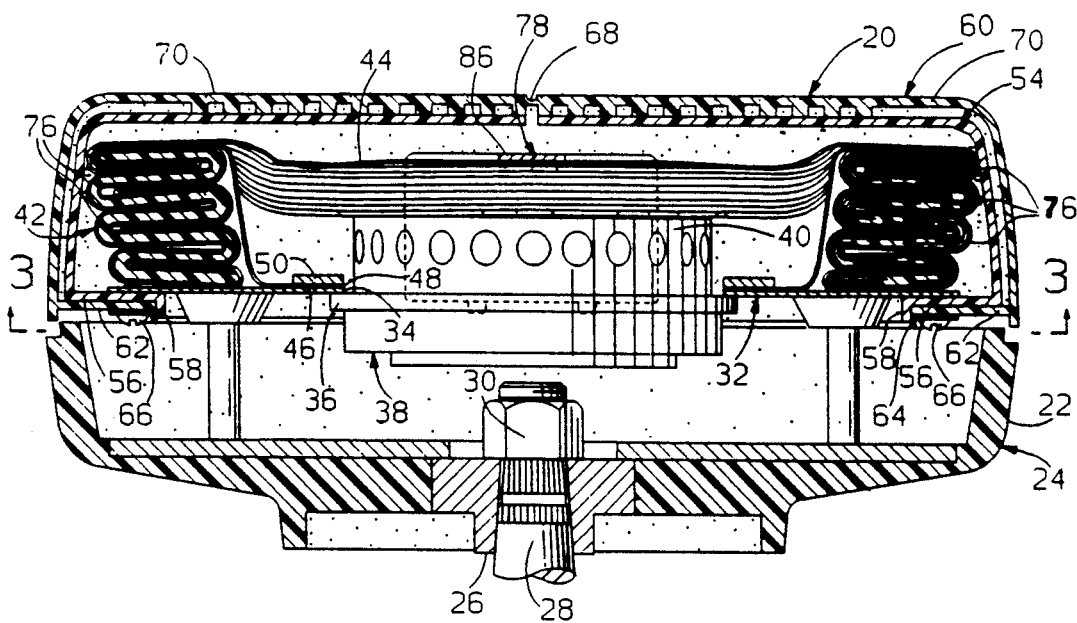
FIG. 2 is an enlarged sectional view taken generally along the plain indicated by line 2—2 of FIG. 1.

Referring now to FIGS. 1 through 4 of the drawings, an occupant restraint system 20 is shown mounted in a conventional manner to the hub portion 22 of a vehicle steering wheel 24. The hub portion includes a splined bushing 26 which receives the upper splined end of the vehicle steering shaft 28 and is bolted thereto at 30 to secure the steering wheel to the vehicle steering system.

Figure 3:
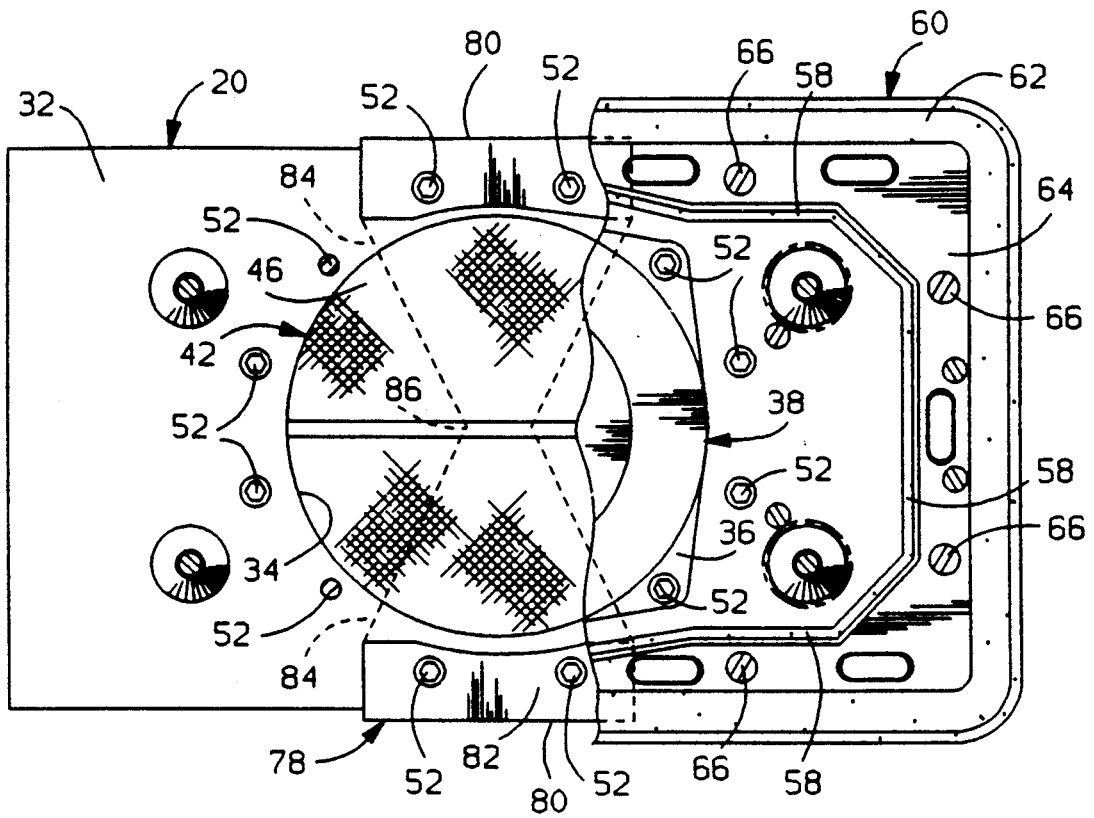
FIG. 3 is a view taken along line 3—3 of FIG. 2.
Figure 4:
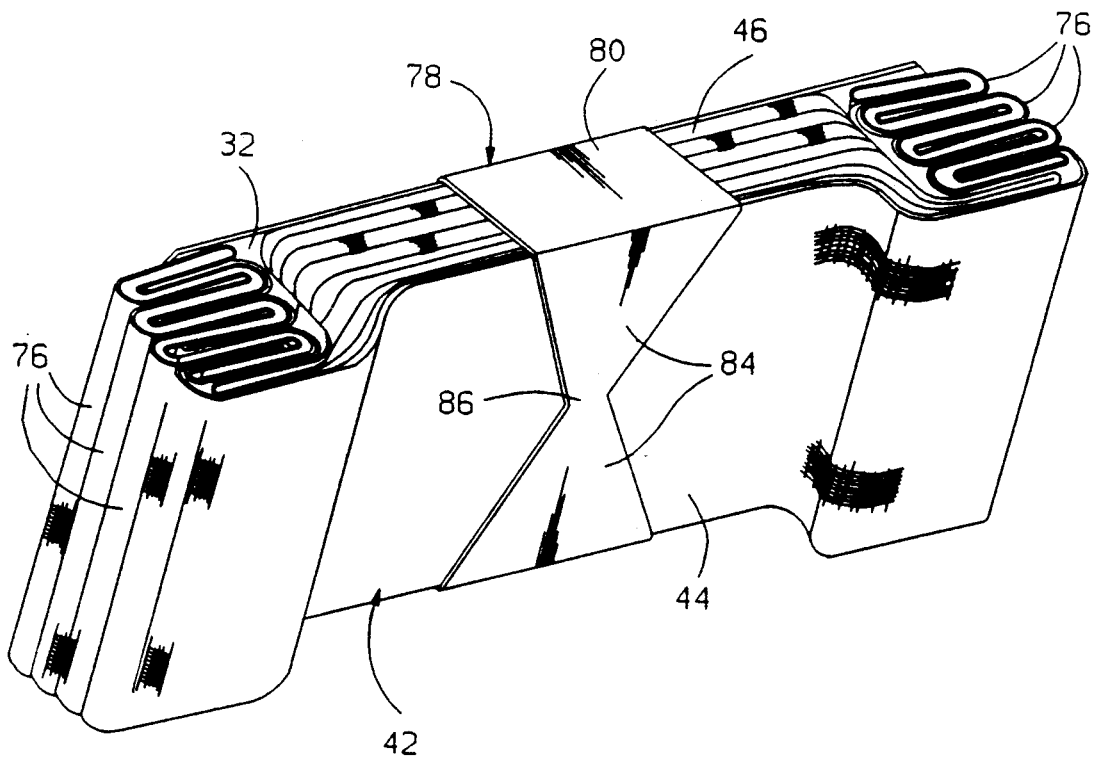
FIG. 4 is a respective view of a portion of FIG. 2.

A generally rectangularly shaped support or plate 32, FIG. 3, has a central circular opening 34. The flange 36, FIG. 2, of a conventional inflator 38 seats against the lower side of the plate 32 and is secured thereto in a conventional manner. The upper outlet portion 40 of the inflator projects through the plate 32 and into the interior of a folded inflatable driver restraint cushion 42. The cushion 42 includes upper and lower or forward and rearward circular members 44 and 46 which are secured together at their circular edge portions. The upper or forward cushion member 44 provides the impact surface of the cushion for the driver when the cushion is inflated, and the lower or rearward cushion member 46 has a central opening 48, FIG. 2, which receives the upper outlet portion 40 of the inflator 38 therethrough. A ring 50 is fastened at 52 to the plate 32 around the opening 34 therein to clamp the cushion member 46 to the plate 32 around the opening 48 therethrough.

The inflator 38 is a gas generator which is electrically actuated from a conventional electrical power source when acceleration or velocity or other type sensors sense the impact of the vehicle with an obstacle or the possibility or probability of such an impact. Such sensors and the circuits connecting the sensors to a power source are well known in the art. Likewise, inflators of the gas generating type are also well known in the art.

A container 54 for the cushion 42 if formed of plastic material and has a generally box-like rectangular shape. The container 54 houses the folded cushion 42 and has a flange 56 which underlies the plate 32 and has lateral flange segments 58 therealong. An outer decorative cover 60 of plastic material is of the same general shape as the container 54. The cover 60 has a flange 62 which overlies the flange 56 of the container. A retainer 64 overlies the flange 62 and is fastened at 66 to the support plate 32 to secure the container and cover to the support plate.

The cover 60 is provided with a molded in generally I shaped line 68 in its forward or upper wall and longer or 6 and 12 o'clock side walls to provide the upper wall with oppositely opening separable flaps 70 and provide the longer side walls with oppositely opening separable flaps 72. The container 54 is provided with lines of perforations which provide like flaps in the upper and longer side walls thereof. The details of the container 54 and the cover 60, and the manner in which each separates into flaps during deployment of the cushion 42 are disclosed in the aforenoted Cok et al application. Such disclosure is incorporated herein by reference. The upper wall of cover 60 may alternately be provided with a generally H shaped molded in line to provide oppositely opening flaps only in the upper wall thereof. The lines of perforations of container 54 will likewise be alternately H shaped.

The plate 32 thus mounts the inflator 38, the cushion 42, the container 54, and the cover 60 to provide the modular restraint system 20.

The manner in which the cushion 42 is folded is disclosed in the aforenoted Cok and Horsch et al applications. Generally, the upper and lower circular cushion members 44 and 46 of the cushion are laid flat with respect to each other, then diametrically opposite chordal portions of the cushion members are fan folded with respect to each other to provide a series of fan folds 74, FIG. 4. Then, each end of the chordal portions and fan folds is pleat folded to provide a series of folds 76, FIG. 4. The folds 76 as a unit are then tucked under or folded under respective ends of the last or proximal fan fold as shown in Horsch et al. rather than extending from such fan fold as shown in Cok et al. The folded cushion thus has fan folded side wall portions and pleat folded end wall portions.

In accordance with this invention a planar band 78 of spring steel material has base or end portions 80 which are flanged at 82 and secured to the lower side of the plate 32 adjacent the longer side edges thereof by the fasteners 52. Asymmetrically arranged apical portions 84 extend from each of the end portions 80 and are integrally joined at a narrow width portion or juncture 86 located above the upper cushion member 44 approximately midway between the like fan folded side wall portions of the folded cushion 42. Successful tests have been conducted with spring steel bands 78 having a thickness of 0.005 inches, a width at their end portions of 50 mm or approximately 2 inches, and a width at the juncture of 6 mm or approximately ¼ inch.

When the inflator 38 receives an appropriate signal, the inflator generates gas or pressure fluid which exits into the interior of the folded cushion 42 through the upper outlet portion 40 of the inflator and the opening 48 of the lower cushion member 46. The pressure fluid initiates inflation or deployment of the cushion.

The band 78 prevents the upper cushion member 44 from initially deploying normal to or toward the vehicle occupant outwardly through the separable flaps 70 of the cover 60 and the corresponding separable flaps of the container 54. The band 78 permits the cushion 42 to initially deploy laterally or generally parallel to the occupant by inflating on opposite side of the band 78 at its pleat folded end wall portions. The cover 60 and container 54 remain intact during such initial deployment of the cushion.

As the initial deployment continues, the internal pressure within the cushion 42 increases. When this pressure reaches a predetermined limit, such as 25 psi, the band 78 ruptures at its juncture 86 to permit the cushion 42 to begin deployment normal to or toward the occupant. If there is no obstruction to the cover 60, the pressure at which the juncture 86 ruptures will correspond to a time after initiation of ignition of the inflator 38, such as 85 ms, and also to a time after initiation of inflation of the cushion 42, such as 30 ms. Thus, the material of the band 78, the thickness of the band, and the width of the juncture 86 will control the time after initiation of deployment when the cushion 42 is permitted to deploy normal to or toward the occupant. While successful tests have been conducted with the band parameters hereinbefore set forth, other parameters can be selected through tests to obtain the desired time after initiation of ignition or after initiation of inflation of the cushion when the cushion is permitted to deploy normal to or toward the occupant.

While the band 78 is shown and described as wrapping around the folded cushion 42 from the longer or 6 and 12 o'clock side edges of plate 32 and the corresponding folded side wall portions of the cushion 42, the band 78 can also wrap around the folded cushion 42 from the shorter or 3 and 9 o'clock end edges of plate 32 and the corresponding folded end wall portions of cushion 42. Although the invention has been described in conjunction with a container 54 and cover 60 having flaps in both their upper walls and their longer or 6 and 12 o'clock side walls, resulting from an I pattern molded in line and I pattern line of perforations, the invention can be used equally as well with a container 54 and cover 60 having flaps only in their upper walls, resulting from an H pattern molded in line and H pattern line of perforations. Likewise, the material of the band 78 and the various dimensions thereof are a matter of selection to obtain the desired pressure at which the band will rupture and the desired time at which deployment of the cushion normal to or toward the occupant occurs.

Thus, this invention provides an improved occupant restraint system which releasably secures an occupant restraint cushion against deployment normal to or toward the occupant.

The embodiments of the invention in which an exclusive property or privilege is claimed are defined as follows:

1. An occupant restraint system for a vehicle occupant comprising, a source of pressure fluid, support means, an inflatable occupant restraint cushion mounted to the support means and including an upper wall portion facing the occupant, a lower wall portion secured to the support means to mount the cushion thereon, a spaced pair of folded side wall portions interconnecting the upper and lower wall portions, and a spaced pair of end wall portions interconnecting the upper and lower wall portions, and a rupturable band having its end portions secured to the support means and extending over the upper wall portion and one spaced pair of wall portions, the rupturable band having a weakened portion intermediate the end portions thereof and opposite the upper wall portion, the weakened portion being ruptured by the force of the cushion thereagainst upon inflation of the cushion from the source of pressure fluid and the attainment by the cushion of a predetermined internal pressure.

2. An occupant restraint system for a vehicle occupant comprising, a source of pressure fluid, support means, an inflatable occupant restraint cushion mounted to the support means and including an upper wall portion, a lower wall portion mounted to the support means and communicating with the source of pressure fluid, a spaced pair of side wall portions interconnecting the upper and lower wall portions, a spaced pair of end wall portions interconnecting the upper and lower wall portions, and a planar band having end portions secured to the support means and extending around the upper wall of the cushion and one pair of spaced wall portions thereof, the band including a narrow width weakened portion opposite the upper wall portion which is ruptured by the force of the cushion thereagainst when the cushion is inflated from the source of pressure fluid and attains a predetermined internal pressure.

3. An occupant restraint system for a vehicle occupant comprising, a source of pressure fluid, support means, an inflatable occupant restraint cushion mounted to the support means and including an upper wall portion, a lower wall portion mounted to the support means and communicating with the source of pressure fluid, a spaced pair of side wall portions interconnecting the upper and lower wall portions, a spaced pair of end wall portions interconnecting the upper and lower wall portions, and a planar band extending around the upper wall of the cushion and one pair of spaced wall portions, the band including end portions secured to the support means and merging into respective tapered portions having apical portions joined to each other across a narrow width juncture, each tapered portion being secured to the support means and the narrow width juncture of the apical portions being ruptured by the force of the cushion thereagainst when the cushion is inflated from the source of pressure fluid and attains a predetermined internal pressure.

4. An occupant restraint system for a vehicle occupant comprising, a source of pressure fluid, support means, an inflatable occupant restraint cushion mounted to the support means and including an upper wall portion, a lower wall portion mounted to the support means and communicating with the source of pressure fluid, a spaced pair of side wall portions interconnecting the upper and lower wall portions, a spaced pair of end wall portions interconnecting the upper and lower wall portions, and a planar band of metal having end portions located opposite one pair of spaced wall portions and secured to the support means, the band further including tapered portions extending from the end portions over the upper wall portion of the cushion and joined at their apical ends across a narrow width weakened juncture, the weakened juncture being ruptured by the force of the cushion thereagainst when the cushion is inflated from the source of pressure fluid and attains a predetermined internal pressure.

* * * * *